United States Patent [19]

Yokota

[11] Patent Number: 4,647,262

[45] Date of Patent: Mar. 3, 1987

[54] REMOVABLE EXPANDING FASTENER

[75] Inventor: Hiroshi Yokota, Okazaki, Japan

[73] Assignees: Toyota Jidosha Kabushiki Kaisha; Daiwa Kasei Kogyo Kabushiki Kaisha, both of Aichi, Japan

[21] Appl. No.: 828,616

[22] Filed: Feb. 13, 1986

[30] Foreign Application Priority Data

Feb. 15, 1985 [JP] Japan .............................. 60-20683[U]
Sep. 17, 1985 [JP] Japan ............................ 60-141909[U]

[51] Int. Cl.⁴ ......................... F16B 13/06; F16B 21/00
[52] U.S. Cl. ...................................... 411/44; 411/349; 24/607; 24/453
[58] Field of Search ...................... 411/15, 44, 45, 349, 411/549–553; 24/590–597, 606, 607, 625, 618, 453

[56] References Cited

U.S. PATENT DOCUMENTS

| 3,272,061 | 9/1966 | Seckerson | 411/15 |
| 3,964,364 | 6/1976 | Poe |  |
| 4,007,516 | 2/1977 | Coules | 411/349 |

FOREIGN PATENT DOCUMENTS 55-45765 11/1980 Japan .

Primary Examiner—Gary L. Smith
Assistant Examiner—Neill Wilson
Attorney, Agent, or Firm—Parkhurst & Oliff

[57] ABSTRACT

Disclosed here is a fastener made of synthetic resin or the like for removably fixing a plurality of plate-like members, said fastener comprising a female member and a male member, said female member comprising a base plate formed with a hole into which a shaft portion of said male member is inserted, a stopper of substantially W-shape in section provided with a pair of leg portions extending from a lower surface of said base plate along an edge portion of said hole and a link portion of substantially inversed U-shape in section for connecting said leg portions, and a pair of engagement projections inwardly projecting from an inner periphery of said hole; said male member comprising a head portion, a shaft portion provided with a neck portion downwardly extending from said head portion and a flat portion downwardly extending from said neck portion and adapted to be inserted into said hole, said flat portion being provided with a pair of stop projections and shoulders adapted to be engaged with said engagement projections at an upper portion thereof, said flat portion being formed with a hollow portion opened at a lower end thereof to thereby form a substantially sectionally rectangular cylindrical shape, wherein said link portion of said stopper is rotatably fitted in said hollow portion, and said leg portions and said link portion are elastically deformed to be spread and contracted in interlocking relation with each other.

12 Claims, 33 Drawing Figures

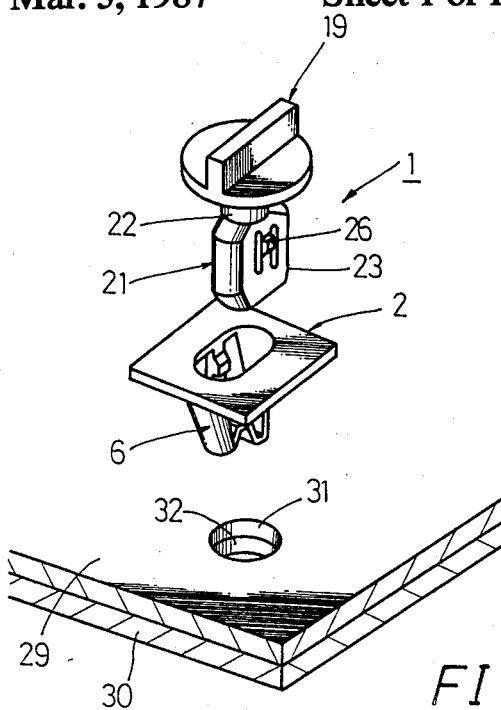
FIG. 1
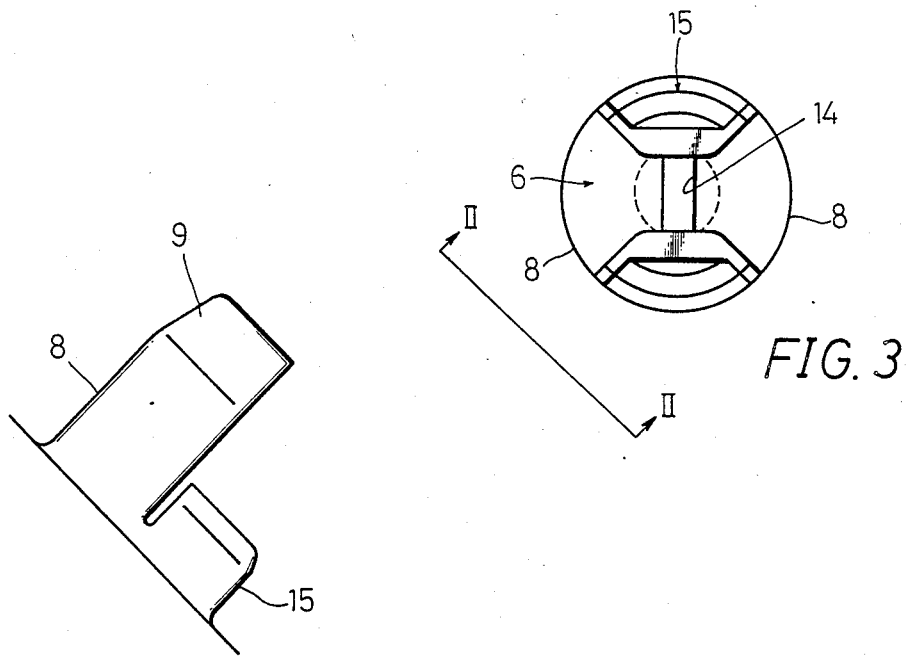
FIG. 3
FIG. 4

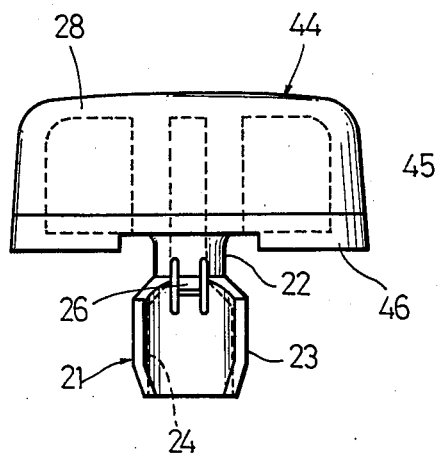
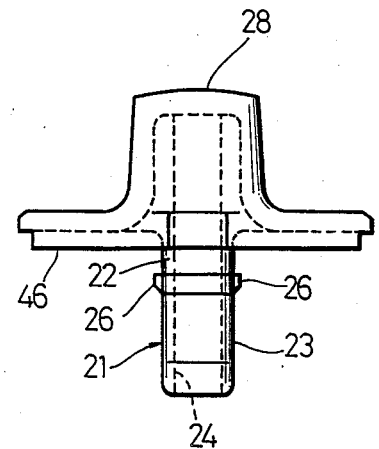
FIG.13
FIG.14
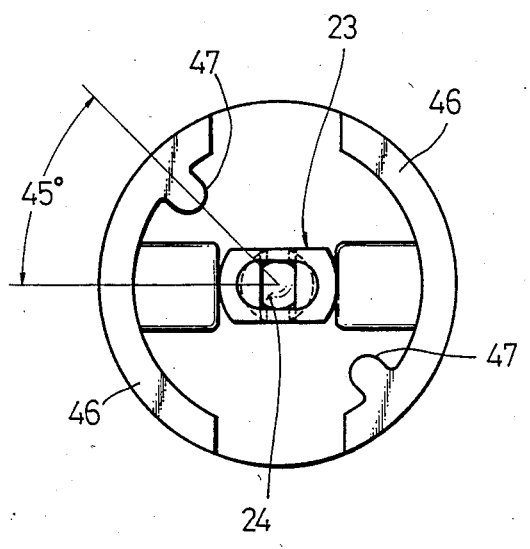
FIG.15

REMOVABLE EXPANDING FASTENER

BACKGROUND OF THE INVENTION

The present invention relates to a fastener for removably fixing a plurality of plate-like members.

A conventional fastener of this type is described in Japanese Patent Publication No. 55-45765. As shown in FIGS. 27 to 29, the conventional fastener 101 is designed to detachably secure a pair of plate-like members 113 and 114 having mating perforations. The fastener 101 comprises a grommet 102 including a head 103 having an opening 104 therethrough and a pair of spreadable essentially parallel stems 105 extending axially from opposite sides of the opening for insertion through the mating perforations, a head 107 and a shank 108. The shank 108 is provided with cam surfaces 109 mutually engageable with the stems 105 of the grommet 102 on the sides thereof. The shank 108 forms a bolt 106 designed to spread the pair of stems 105 of the grommet 102. The stems 105 of the grommet 102 are provided with a pair of laterally offset yieldable fingers extending inwardly therefrom. The shank 108 is formed with an annular groove 111 engageable with the fingers 110 so as to prevent retraction of the bolt 106 from the grommet 102 once the bolt 106 has been inserted therein. The extremity of the shank 108 is initially connected to the head 103 of the grommet 102 by frangible connecting webs 112.

According to the structure of the conventional fastener as aforementioned, after the bolt 106 is inserted into the grommet 102, and the stems 105 of the grommet 102 are creeped under a spread condition after a long time, the stems 105 are not returned to their original condition irrespective of rotation of the bolt 106. Accordingly, insertion of the grommet into the mating perforations of the plate-like members 113 and 114 is rendered difficult to cause reduction in working efficiency.

SUMMARY OF THE INVENTION

It is an object of the present invention to provide a fastener having leg portions of the female member which may be returned to their original position even when the leg portions have been creeped to be outwardly spread.

According to one aspect of the present invention, there is provided a fastener made of synthetic resin or the like for removably fixing a plurality of plate-like members, said fastener comprising a female member and a male member, said female member comprising a base plate formed with a hole into which a shaft portion of said male member is inserted, a stopper of substantially W-shape in section provided with a pair of leg portions extending from a lower surface of said base plate along an edge portion of said hole and a link portion of substantially inversed U-shape in section for connecting said leg portions, and a pair of engagement projections inwardly projecting from an inner periphery of said hole; said male member comprising a head portion, a shaft portion provided with a neck portion downwardly extending from said head portion and a flat portion downwardly extending from said neck portion and adapted to be inserted into said hole, said flat portion being provided with a pair of stop projections and shoulders adapted to be engaged with said engagement projections at an upper portion thereof, said flat portion being formed with a hollow portion opened at a lower end thereof to thereby form a substantially sectionally rectangular cylindrical shape, wherein said link portion of said stopper is rotatably fitted in said hollow portion, and said leg portions and said link portion are elastically deformed to be spread and contracted in interlocking relation with each other.

With this arrangement, even if the leg portions are creeped under the spread condition after a long time is elasped under such a condition where the female member and the male member are lockingly engaged with each other to fix the plate-like members, the leg portions may be forcibly returned to their original condition by rotating the male member at 90 degrees and forcibly contracting the link portion as spread with the aid of the flat portion. Accordingly, in using the fastener again, the fastener may be easily inserted into the mount holes without any inconvenience, and the plate-like members may be securely fixed to each other. Further, as the female member and the male member are used as an assembly after both the members are engaged with each other, handling of parts may be made easy.

According to another aspect of the present invention, there is provided a fastener made of synthetic resin or the like for removably fixing a plurality of plate-like members, said fastener comprising a female member and a male member, said female member comprising a base plate formed with a hole into which a shaft portion of said male member is inserted, a pair of opposed stoppers of substantially W-shape in section provided with a pair of leg portions extending from a lower surface of said base plate along an edge portion of said hole and a pair of engagement portions upwardly extending from lower ends of said leg portions and arranged in opposed relation with each other, and a pair of engagement projections inwardly projecting from an inner periphery of said hole; said male member comprising a head portion, a shaft portion provided with a neck portion downwardly extending from said head portion and a flat portion downwardly extending from said neck portion and adapted to be inserted into said hole, said flat portion being provided with a pair of stop projections and shoulders adapted to be engaged with said engagement projections at an upper portion thereof, said flat portion being formed with a hollow portion opened at a lower end thereof to thereby form a substantially sectionally rectangular cylindrical shape, wherein said engagement portions of said stopper are rotatably fitted in said hollow portion, and said leg portions and said engagement portions are elastically deformed to be spread and contracted in interlocking relation with each other.

With this arrangement, even if the leg portions are creeped under the spread condition after a long time is elasped under such a condition where the female member and the male member are lockingly engaged with each other to fix the plate-like members, the leg portions may be forcibly returned to their original condition by rotating the male member at 90 degrees and forcibly contracting the link portion as spread with the aid of the flat portion. Accordingly, in using the fastener again, the fastener may be easily inserted into the mount holes without any inconvenience, and the plate-like members may be securely fixed to each other. Further, both the engagement portions may be arranged more nearly to reduce a predetermined width, so as to reduce a dimension of associated parts and thereby make a size of the fastener. The diameter of the mount holes of the plate-like members may be also reduced to secure a strength of the plate-like members. Further, as the female member and the male member are used as an assembly after both the members are engaged with each other, handling of parts may be made easy.

The invention will be more fully understood from the following detailed description and appended claims when taken with the drawings.

BRIEF DESCRIPTION OF THE DRAWINGS

FIG. 1 is an exploded perspective view of the fastener of a first preferred embodiment according to the present invention;

FIG. 3 is a bottom plan view of the stopper and the guides of the female member;

FIG. 4 is a view taken in the direction of the arrows along the line II—II in FIG. 3;

FIG. 13 is an elevational view of the male member in the second embodiment;

FIG. 14 is a side view of the male member;

FIG. 15 is a bottom plan view of the male member;

DETAILED DESCRIPTION OF THE PREFERRED EMBODIMENTS

Figure 2:
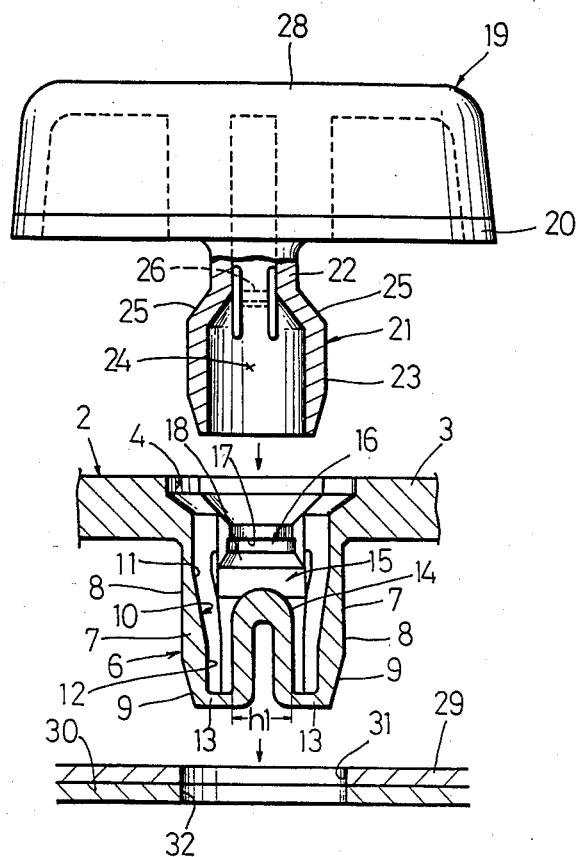
FIG. 2 is a vertical sectional view of the female member, the male member and the plate-like members.
Figure 5:
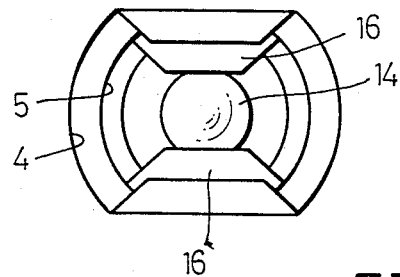
FIG. 5 is a plan view of the insertion hole of the female member.
Figure 6:
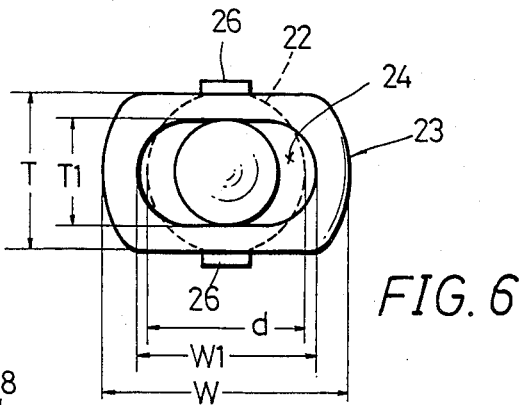
FIG. 6 is a bottom plan view of the shaft portion of the male member.
Figure 7A:
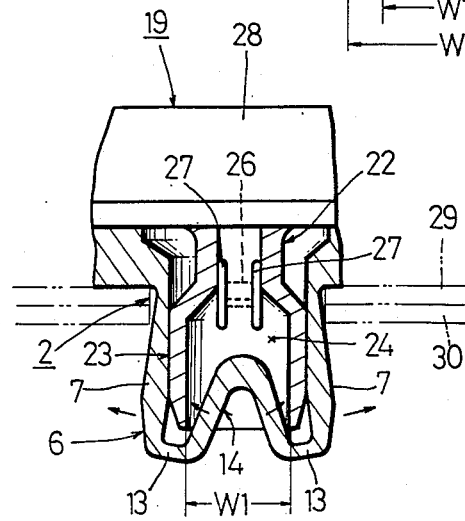
FIGS. 7A, 7B, 8A and 8B are illustrations of operation of the fastener.
Figure 7B:
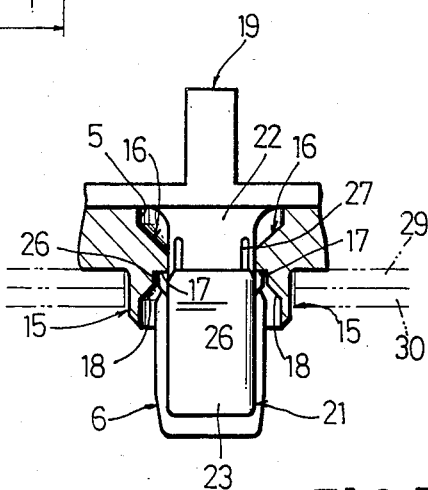
Figure 8A:
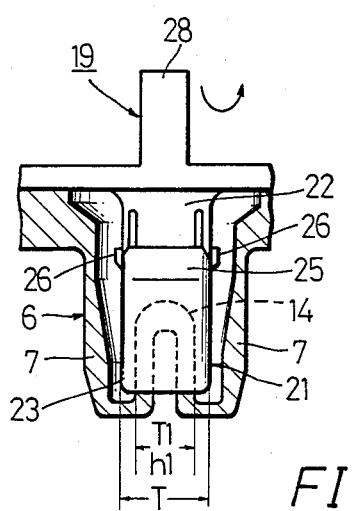
Figure 8B:
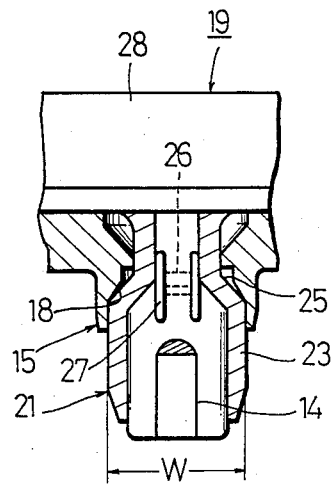
Figure 9:
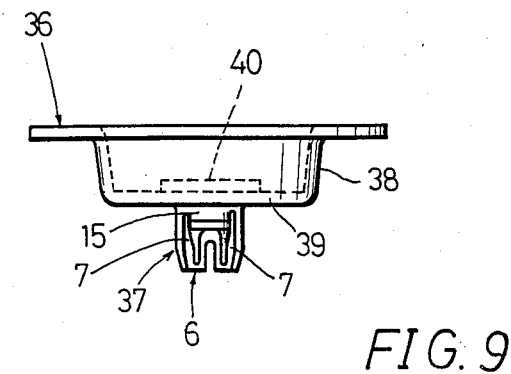
FIG. 9 is an elevational view of the lid in a second preferred embodiment according to the present invention.
Figure 11:
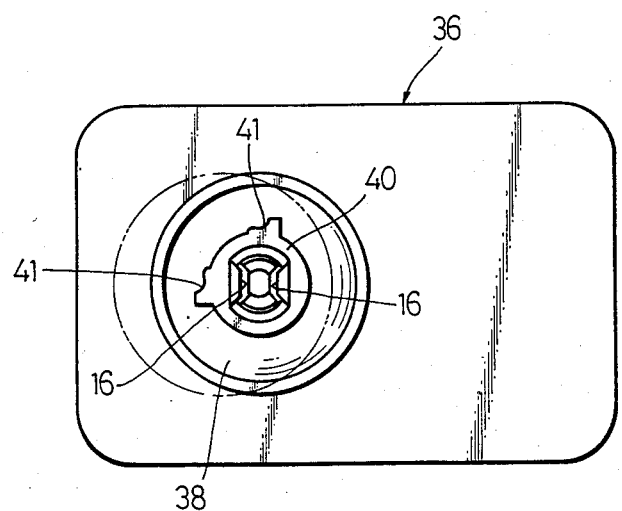
FIG. 11 is a plan view of the lid.
Figure 10:
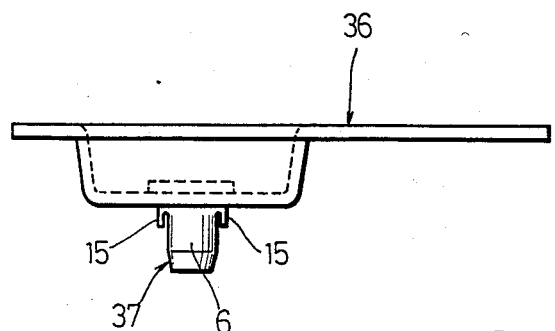
FIG. 10 is a side view of the lid.
Figure 12:
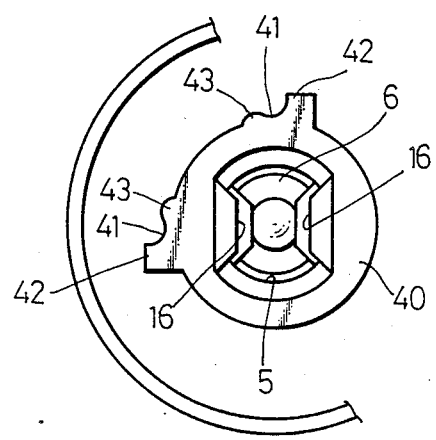
FIG. 12 is an enlarged view of a part encircled by a chain line in FIG. 11.
Figure 16:
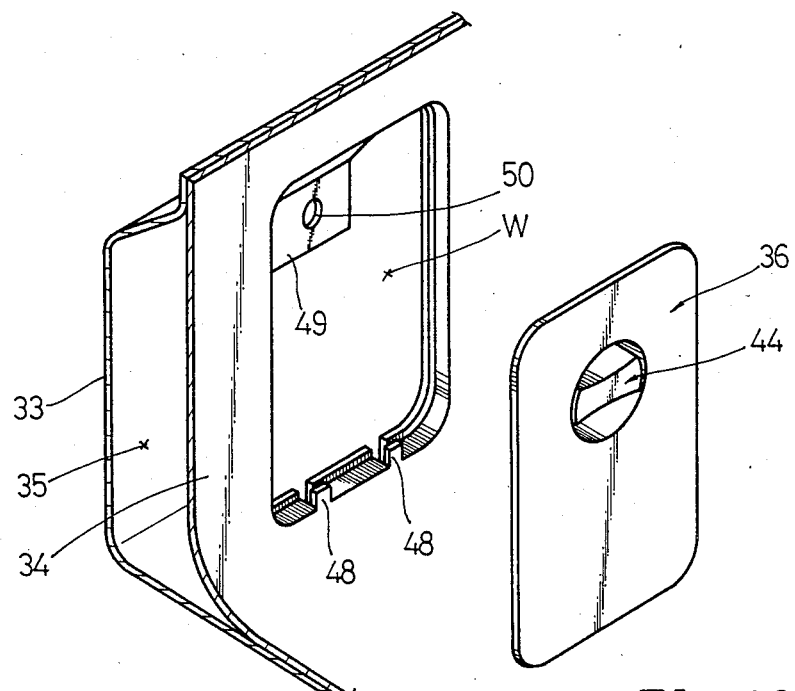
FIG. 16 is a perspective view illustrating installation of the lid.
Figure 17:
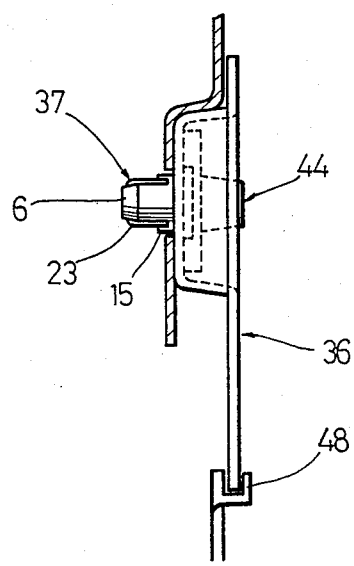
FIG. 17 is a vertical sectional view of the lid as installed.
Figure 18:
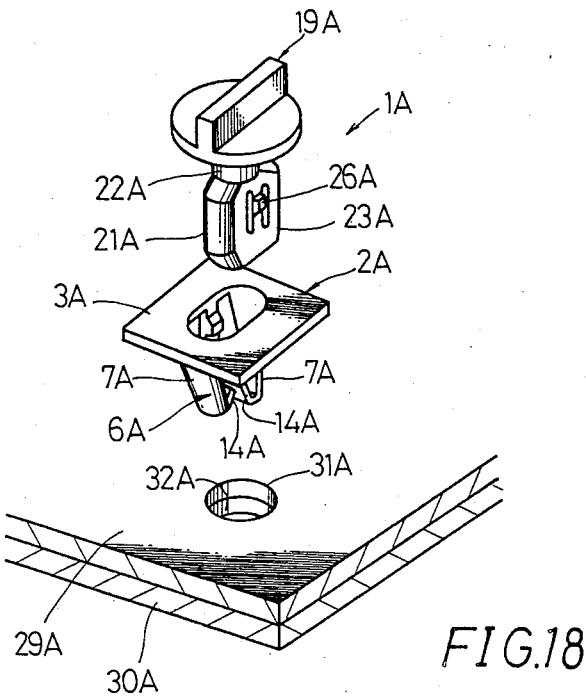
FIG. 18 is an exploded perspective view of the fastener of a third preferred embodiment.
Figure 20:
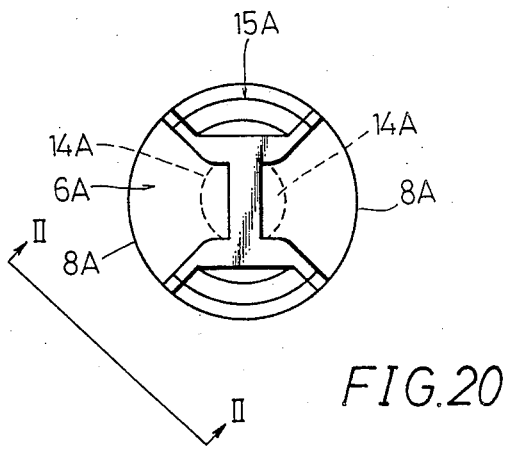
FIG. 20 is a bottom plan view of the stopper and the guides of the female member.
Figure 21:
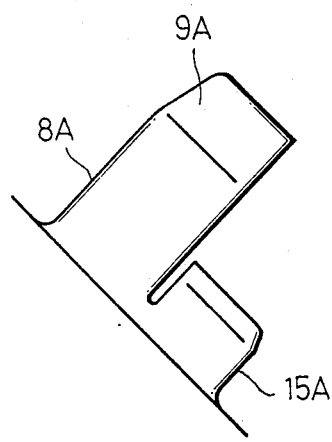
FIG. 21 is a view taken in the direction of the arrows along the line II—II in FIG. 20.
Figure 19:
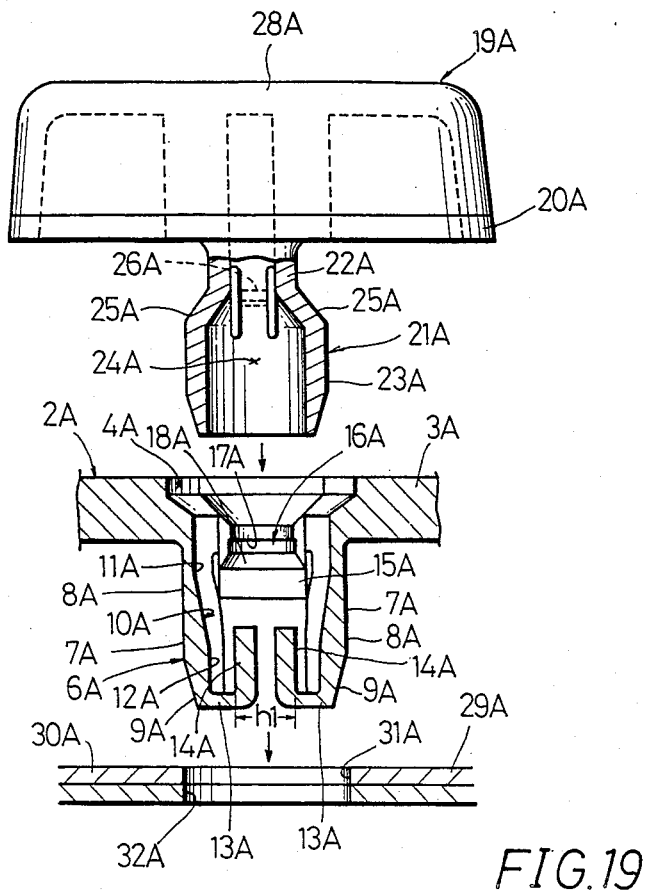
FIG. 19 is a vertical sectional view of the female member, the male member and the plate-like members.
Figure 22:
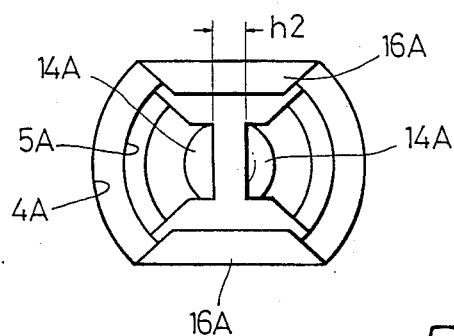
FIG. 22 is a plan view of the insertion hole of the female member.
Figure 23:
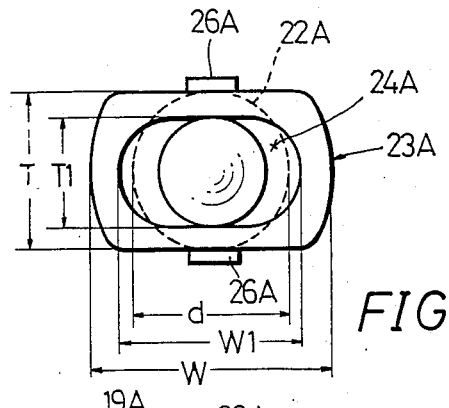
FIG. 23 is a bottom plan view of the shaft portion of the male member.

Referring to FIGS. 1 to 8 showing a first preferred embodiment, reference numeral 1 generally designates a fastener for fixing plate-like members 29 and 30. The fastener 1 is composed of a female member 2 and a male member 19.

Reference numeral 3 designates a base plate of the female member 2 which plate is substantially flatly formed. The base plate 3 is formed with an elongated recess 4 having an insertion hole 5 for permitting insertion of the male member 19. There is formed at a lower peripheral edge of the insertion hole 5 a stopper 6 of substantially W-shape in section, and there are formed at the peripheral edge perpendicular to the stopper 6 guides 15 adapted to come into contact with a peripheral edge of mount holes 31 and 32 of the plate-like members 29 and 30. The stopper 6 and the guides 15 are adapted to be inserted into the mount holes 31 and 32.

The stopper 6 is formed with leg portions 7 downwardly extending along the peripheral edge of the insertion hole 5 corresponding to an arcuate edge of the recess 4 and with a link portion 14 of inversed U-shape. The leg portions 7 are arcuate with a predetermined thickness at its base. The leg portions 7 are formed with outer arcuate surfaces 8 having the same arc extending near to its lower portion, and with slant surfaces 9 inclined to an axis side of the insert hole 5 at the lower portion. The leg portions 7 are further formed with inner arcuate surfaces 10 having slant surfaces 11 downwardly inclined near from its base to the axis side of the insert hole 5 and also having vertical surfaces 12 at its lower end portion. Thin-walled portions 13 are oppositely formed at the lower ends of the leg potions 7. The link portion 14 is formed in substantially semi-circular and inversed U-shape in section between both the thin-walled portions 13. That is, the leg portions 7 are integrally connected through the thin-walled portions 13 with the link portion 14 to thereby form the stopper 6 of substantially W-shape in section. The leg portions 7 are elastically deformable so as to be spread about the base portion thereof, and the link portion 14 is adapted to be spread about its top in cooperation with the elastic deformation of the leg portions 7. Under a normal or unspread condition, a width of the U-shape of the link portion 14 is set to a predetermined value h1.

The arcuate guides 15 are formed in a tongue-like shape as viewed in section with a predetermined thickness as extending from the peripheral edge of the insert hole 5 perpendicular to the stopper 6, and are adapted to come into contact with the peripheral edge of the mount holes 31 and 32 of the plate-like members 29 and 30. There are formed on the peripheral edge of the insertion hole 5 and the inside surface of the guides 15 engagement projections 16 having horizontal upper guide surfaces 17 and slanted lower guide surfaces 18. The existence of the engagement projections 16 makes the insert hole 5 substantially rectangular with an arcuate portion.

The male member 19 includes a substantially planar head portion 20 and a shaft portion 21 having a flat portion 23 adapted to be inserted into the insert hole 5 of the female member 2.

The shaft portion 21 is formed with a neck portion 22 having a predetermined diameter, that is, a diameter (d) allowed to be inserted between both the engagement projections 16, and a predetermined length at a substantially central position of the head portion 20. The flat portion 23 is integrally formed with the neck portion 22 in such a manner as to downwardly extend therefrom. The flat portion 23 has a width W allowed to be inserted into the insert hole 5 and a thickness T equal to the diameter (d) of the neck portion 22. Opposite outer surfaces of the flat portion 23 in the direction of the thickness T is formed arcuately. The flat portion 23 is further formed with a hollow portion 24 having a lower opening of substantially rectangular in section. A width of the lower opening of the hollow portion 24 in the direction of the width W is set to W1 permitting expansion of the link portion 14 of the female member 2, while a width in the direction of the thickness T is set to T1 permitting insertion of the link portion 14 having the width h1 under the normal condition. The hollow portion 24 extends to the neck portion 22. The flat portion 23 is formed at its upper part with shoulder portions 25 inclined at a predetermined angle from a junction of the neck portion 22 in the direction of the width W. The shoulder portions 25 are adapted to engage with the lower guide surfaces 18 formed at the engagement projections 16 of the female member 2. The flat portion 23 is further formed at the junction of the neck portion 22 at the center in the direction of the width W with stop projections 26 adapted to engage with the upper guide surfaces 17 formed at the engagement projections 16 of the female member 2. The stop projections 26 are formed with slits 27 on both sides thereof, and are allowed to be elastically deformed. Reference numeral 28 designates a handle provided on the upper surface of the head portion 20.

In operation, when the stopper 6 of the female member
inserted into the mount holes 31 and 32 of the plate-like members 29 and 30 as registered, the base portions of the outer arcuate surfaces 8 of the leg portions 7 and the outer arcuate surfaces of the guides 15 are brought into contact with the edges of the mount holes 31 and 32. Thereafter, when the flat portion 23 of the male member 19 is inserted into the insert hole 5, both the side surfaces of the flat portion 23 in the direction of the thickness T are brought into contact with the vertical surfaces 12 of the inner arcuate surfaces 10 of the leg portions 7, and the link portion 14 is inserted into the hollow portion 24 of the flat portion 23. As the width W of the flat portion 23 is greater than the distance between both the vertical surfaces 12 of the leg portions 7, both the leg portions 7 are elastically deformed by the flat portion 23 to be outwardly spread, and simultaneously the link portion 14 connected to the leg portions 7 is elastically deformed in the hollow portion 24 to be outwardly spread about its top. With further insertion of the flat portion 23, the stop projections 26 are brought into contact with the upper projected portions of the engagement projections 16, and is elastically deformed to the hollow portion 24 side. Then, the stop projections 26 pass through the upper projected portions of the engagement projections 16, and simultaneously they are elastically returned to its original condition to be engaged with the upper guide surfaces 17 of the engagement projections 16. Thus, the leg portions 7 of the female member 2 are outwardly spread below the mount holes 31 and 32 by the flat portion 23 of the male member 19, and the stop projections 26 of the male member 19 are lockingly engaged with the engagement projections 16 of the female member 2 to intensively fix the plate-like members 29 and 30.

In the case that the fixed condition of the plate-like members 29 and 30 is intended to be released, the handle 28 provided at the head portion 20 of the male member 19 is rotated at 90 degrees to rotate the flat portion 23 of the shaft portion 21 at 90 degrees about the neck portion 22 and thereby release the spread condition of the leg portions 7. Then, the stop projections 26 of the flat portion 23 is slided to be disengaged from the upper guide surfaces 17. At the same time, the link portion 14 in the hollow portion 14 under the spread condition is forcibly contracted by the sides of the flat portion 23 in the direction of the width W, and the leg portions 7 are also forcibly returned to their original condition. As a result, the distance between both the leg portions 7 is slightly smaller than the diameter of the mount holes 31 and 32, and the shoulder portions 25 of the flat portion 23 are engaged with the lower guide surfaces 18 of the engagement projections 16 of the female member 2. Then, the handle 28 is upwardly drawn to remove the male member 19 and the female member 2 as integrally fixed to each other and thereby release the fixed condition of the plate-like members 29 and 30.

In the case that the fastener 1 is intended to be fixed to the plate-like members 29 and 30, the fastener 1 is inserted into the mount holes 31 and 32, and the handle 29 is rotated at 90 degrees to rotate the flat portion 23. As a result, the leg portions 7 are elastically deformed to be outwardly spread, and the stop projections 26 are engaged with the upper guide surfaces 17 to thereby fix the plate-like members 29 and 30.

According to the fastener of the preferred embodiment, even if the leg portions 7 are creeped under the spread condition after a long time is elasped under such a condition where the female member 2 and the male member 19 are lockingly engaged with each other to fix the plate-like members 29 and 30, the leg portions 7 may be forcibly returned to their original condition by rotating the male member 19 at 90 degrees and forcibly contracting the link portion 14 as spread with the aid of the flat portion 23. Accordingly, in using the fastener again, the fastener may be easily inserted into the mount holes 31 and 32 without any inconvenience, and the plate-like members 29 and 30 may be securely fixed to each other. Further, as the female member 2 and the male member 19 are used as an assembly after both the members are once engaged with each other, handling of parts may be made easy.

Referring next to FIGS. 9 to 17 showing a second preferred embodiment, a space 35 defined between a body 33 and a trim 34 is utilized as a storing space for example, and the fastener 1 is utilized for a lid 36 for closing an opening W opened through the trim 34, the lid 36 including a female member 37 and a male member 44 as integrally formed.

The female member 37 is integrally formed with a bottom portion 39 (corresponding to the base plate 3 in the first preferred embodiment) of a recess 38 formed at the lid 36, the recess 38 having a predetermined diameter and a predetermined depth. The bottom portion 39 is formed with an insertion hole 5 at the center thereof to form a stopper 6, guides 15 and engagement projections 16 in the same manner as in the first preferred embodiment. The bottom portion 39 is formed with a trapezoidal projection 40 on the upper side thereof, which projection has a predetermined radius from the center of the insert hole 5 and a predetermined height. The trapezoidal projection 40 is formed at its outer circumference with stoppers 42 and projections 43 to provide locking recesses 41 at right angles to each other, so as to restrict rotation of the male member 44. A head portion 45 of the male member 44 is inertable into the recess 38, and the handle 28 has a height such that it is almost sunk in the recess 38. The head portion 45 is formed with a shaft portion 21 including a neck portion 22 and a flat portion 23 at the center of the lower surface thereof in the same manner as in the first preferred embodiment. The head portion 45 is formed with projecting edges 46 having a height almost equal to that of the trapezoidal projection 40 at a lower surface edge thereof. The projecting edges 46 are formed with opposite locking projections 47 adapted to engage with the locking recesses 41 at an angular position of 45 degrees from the center in the direction of the shorter side of the flat portion 23 in such a manner as to inwardly project toward the center of the shaft portion 21. When the male member 44 and the female member 37 are engaged with each other in the same manner as in the first preferred embodiment, rotation of one of the locking projections 47 is restricted to 90 degrees by one of the stoppers 42. Namely, since the locking projections 47 are oppositely arranged, the male member 44 may be engaged with the female member 37 irrespective of the direction to the stoppers 42.

In the case that the opening W of the lid 36 is intended to be closed, the male member 44 is rotated to release a contact between the flat portion 23 and the leg portions 7, and a side edge of the lid 36 is engaged with stop pawls 48 formed at an edge of the opening W. Then, the fastener 1 is inserted into a mount hole 50 formed through a receiving plate 49 projecting into the opening W, and the handle 28 is rotated at 90 degrees. As a result, the flat portion 23 is rotated to elastically deform and spread the leg portions 7, and the stop projections 26 are engaged with the upper guide surfaces 17 to fix the lid 36 to the receiving plate 49. At the same time, one of the locking projections 47 is engaged with one of the locking recesses 41 to close the opening W.

In the case that the lid 36 is intended to be removed, the handle 28 is rotated reversely at 90 degrees to forcibly contract the link portion 14 as spread in the hollow portion 24 by the long sides in the direction of the width W of the flat portion 23. As a result, the leg portions 7 connected to the link portion are also forcibly returned to their original condition. In this connection, the distance between both the leg portions 7 is slightly smaller than the diameter of the mount hole 50, and the shoulder portions 25 of the flat portion 23 are engaged with the lower guide surfaces 18 of the engagement projections 16 of the female member 2. Then, the handle 28 is upwardly drawn to release the fixed condition of the receiving plate 49.

Referring to FIGS. 18 to 26 showing a third preferred embodiment, reference numeral 1A generally designates a fastener for fixing plate-like members 29A and 30A. The fastener 1A is composed of a female member 2A and a male member 19A.

Reference numeral 3A designates a base plate of the female member 2A which plate is substantially flatly formed. The base plate 3A is formed with an elongated recess 4A having an insertion hole 5A for permitting insertion of the male member 19A. There are formed at a lower peripheral edge of the insertion hole 5A opposite stoppers 6A of substantially U-shape in section, and there are formed at the peripheral edge perpendicular to the stoppers 6A guides 15A adapted to come into contact with a peripheral edge of mount holes 31A and 32A of the plate-like members 29A and 30A. The stoppers 6A and the guides 15A are adapted to be inserted into the mount holes 31A and 32A.

The stoppers 6A are formed with leg portions 7A downwardly extending along the peripheral edge of the insertion hole 5A corresponding to an arcuate edge of the recess 4A and with opposite engagement portions 14A as upwardly bent. The leg portions 7A are arcuate with a predetermined thickness at its base. The leg portions 7A are formed with outer arcuate surfaces 8A having the same arc extending near to its lower portion, and with slant surfaces 9A inclined to an axis side of the insert hole 5A at the lower portion. The leg portions 7A are further formed with inner arcuate surfaces 10A having slant surfaces 11A downwardly inclined near from its base to the axis side of the insert hole 5A and also having vertical surfaces 12A at its lower end portion. Thin-walled portions 13A are oppositely formed at the lower ends of the leg potions 7A. The engagement portions 14A are formed between both the thin-walled portions 13A. That is, the leg portions 7A are integrally connected through the thin-walled portions 13A with the engagement portions 14A to thereby form the stoppers 6A of substantially U-shape in section. The leg portions 7A are elastically deformable so as to be spread about the base portion thereof, and the engagement portions 14A are adapted to be outwardly spread in cooperation with the elastic deformation of the leg portions 7A. Under a normal or unspread condition, a distance between the outer surfaces of the engagement portions 14A is set to a predetermined value h1, while a distance between the inner opposed surfaces is set to a predetermined value h2.

The arcuate guides 15A are formed in a tongue-like shape as viewed in section with a predetermined thickness as extending from the peripheral edge of the insert hole 5A perpendicular to the stoppers 6A, and are adapted to come into contact with the peripheral edge of the mount holes 31A and 32A of the plate-like members 29A and 30A. There are formed on the peripheral edge of the insertion hole 5A and the inside surface of the guides 15A engagement projections 16A having horizontal upper guide surfaces 17A and slanted lower guide surfaces 18A. The existence of the engagement projections 16A makes the insert hole 5A substantially rectangular with an arcuate portion.

The male member 19A includes a substantially planar head portion 20A and a shaft portion 21A having a flat portion 23A adapted to be inserted into the insert hole 5A of the female member 2A.

The shaft portion 21A is formed with a neck portion 22A having a predetermined diameter, that is, a diameter (d) allowed to be inserted between both the engagement projections 16A, and a predetermined length at a substantially central position of the head portion 20A. The flat portion 23A is integrally formed with the neck portion 22A in such a manner as to downwardly extend therefrom. The flat portion 23A has a width W allowed to be inserted into the insert hole 5A and a thickness T equal to the diameter (d) of the neck portion 22A. Opposite outer surfaces of the flat portion 23A in the direction of the thickness T is formed arcuately. The flat portion 23A is further formed with a hollow portion 24A having a lower opening of substantially rectangular in section. A width of the lower opening of the hollow portion 24A in the direction of the width W is set to W1 permitting expansion of the engagement portions 14A of the female member 2A, while a width in the direction of the thickness T is set to T1 permitting insertion of the engagement portions 14A having the width h1 under the normal condition. The hollow portion 24A extends to the neck portion 22A. The flat portion 23A is formed at its upper part with shoulder portions 25A inclined at a predetermined angle from a junction of the neck portion 22A in the direction of the width W. The shoulder portions 25A are adapted to engage with the lower guide surfaces 18A formed at the engagement projections 16A of the female member 2A. The flat portion 23A is further formed at the junction of the neck portion 22A at the center in the direction of the width W with stop projections 26A adapted to engage with the upper guide surfaces 17A formed at the engagement projections 16A of the female member 2A. The stop projections 26A are formed with slits 27A on both sides thereof, and are allowed to be elastically deformed. Reference numeral 28A designates a handle provided on the upper surface of the head portion 20A.

In operation, when the stoppers 6A of the female member 2A are inserted into the mount holes 31A and 32A of the plate-like members 29A and 30A as registered, the base portions of the outer arcuate surfaces 8A of the leg portions 7A and the outer arcuate surfaces of the guides 15A are brought into contact with the edges of the mount holes 31A and 32A. Thereafter, when the flat portion 23A of the male member 19A is inserted into the insert hole 5A, both the side surfaces of the flat portion 23A in the direction of the thickness T are brought into contact with the vertical surfaces 12A of the inner arcuate surfaces 10A of the leg portions 7A, and the engagement portions 14A is inserted into the hollow portion 24A of the flat portion 23A. As the width W of the flat portion 23A is greater than the distance between both the vertical surfaces 12A of the leg portions 7A, both the leg portions 7A are elastically deformed by the flat portion 23A to be outwardly spread, and simultaneously the engagement portions 14A connected to the leg portions 7A are elastically deformed in the hollow portion 24A to be outwardly spread. With further insertion of the flat portion 23A, the stop projections 26A are brought into contact with the upper projected portions of the engagement projections 16A, and is elastically deformed to the hollow portion 24A side. Then, the stop projections 26A pass through the upper projected portions of the engagement projections 16A, and simultaneously they are elastically returned to its original condition to be engaged with the upper guide surfaces 17A of the engagement projections 16A. Thus, the leg portions 7A of the female member 2A are outwardly spread below the mount holes 31A and 32A by the flat portion 23A of the male member 19A, and the stop projections 26A of the male member 19A are lockingly engaged with the engagement projections 16A of the female member 2A to intensively fix the plate-like members 29A and 30A.

In the case that the fixed condition of the plate-like members 29A and 30A is intended to be released, the handle 28A provided at the head portion 20A of the male member 19A is rotated at 90 degrees to rotate the flat portion 23A of the shaft portion 21A at 90 degrees about the neck portion 22A and thereby release the spread condition of the leg portions 7A. Then, the stop projections 26A of the flat portion 23A are slided to be disengaged from the upper guide surfaces 17A. At the same time, the engagement portions 14A in the hollow portion 24A under the spread condition is forcibly contracted by the sides of the flat portion 23A in the direction of the width W, and the leg portions 7A are also forcibly returned to their original condition. As a result, the distance between both the leg portions 7A is slightly smaller than the diameter of the mount holes 31A and 32A, and the shoulder portions 25A of the flat portion 23A are engaged with the lower guide surfaces 18A of the engagement projections 16A of the female member 2A. Then, the handle 28A is upwardly drawn to remove the male member 19A and the female member 2A as integrally fixed to each other and thereby release the fixed condition of the plate-like members 29A and 30A.

In the case that the fastener 1A is intended to be fixed to the plate-like members 29A and 30A, the fastener 1A is inserted into the mount holes 31A and 32A, and the handle 28A is rotated at 90 degrees to rotate the flat portion 23A. As a result, the leg portions 7A are elastically deformed to be outwardly spread, and the stop projections 26A are engaged with the upper guide surfaces 17A to thereby fix the plate-like members 29A and 30A.

According to the fastener of the preferred embodiment, even if the leg portions 7A are creeped under the spread condition after a long time is elasped under such a condition where the female member 2A and the male member 19A are lockingly engaged with each other to fix the plate-like members 29A and 30A, the leg portions 7A may be forcibly returned to their original condition by rotating the male member 19A at 90 degrees and forcibly contracting the engagement portions 14A as spread with the aid of the flat portion 23A. Accordingly, in using the fastener again, the fastener may be easily inserted into the mount holes 31A and 32A without any inconvenience, and the plate-like members 29A and 30A may be securely fixed to each other. Further, both the engagement portions 14A may be arranged more nearly to reduce the width h2, so as to reduce a dimension of associated parts and thereby make a size of the fastener compact. The diameter of the mount holes 31A and 32A of the plate-like members 29A and 30A may be also reduced to secure a strength of the plate-like members 29A and 30A. Further, as the female member 2A and the male member 19A are used as an assembly after both the members are once engaged with each other, handling of parts may be made easy.

Figure 26:
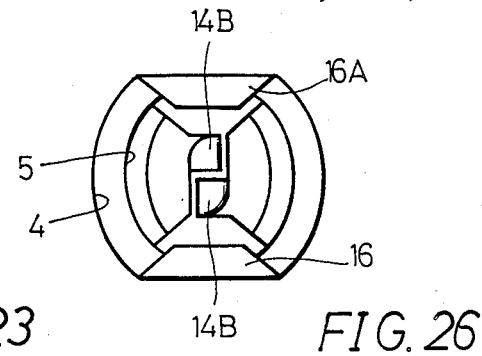
FIG. 26 is a bottom plan view of modification of the engagement portions of the stopper.
Figure 24A:
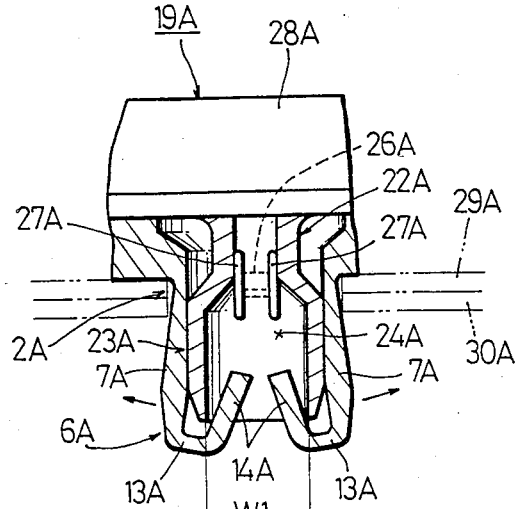
FIGS. 24A, 24B, 25A and 25B are illustrations of operation of the fastener.
Figure 24B:
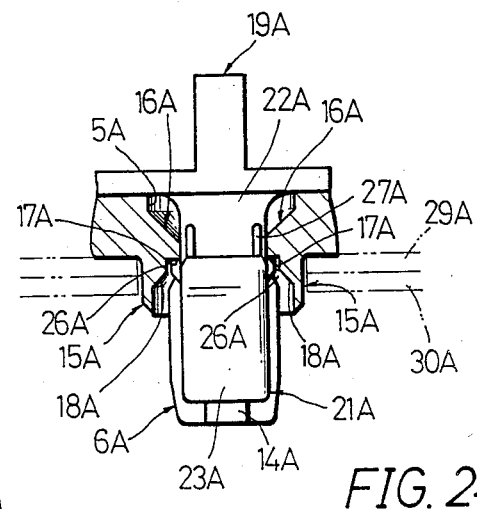
Figure 25A:
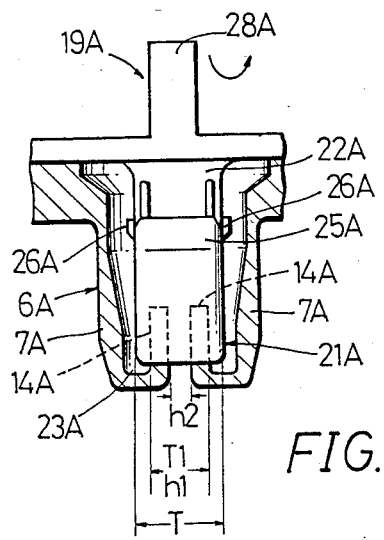
Figure 25B:
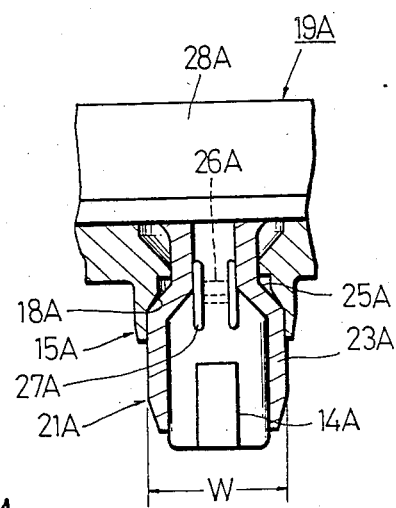
Figure 27:
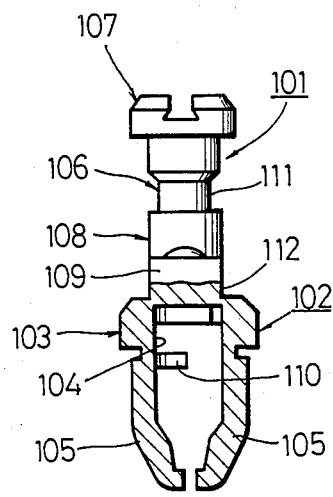
FIGS. 27 to 29 are vertical sectional views of the fastener in the prior art.
Figure 28:
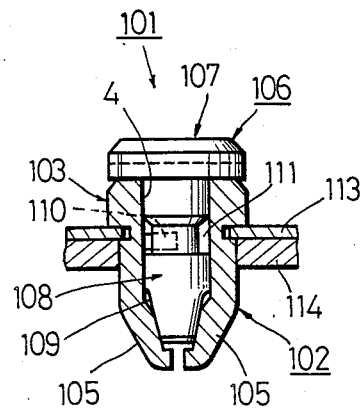
Figure 29:
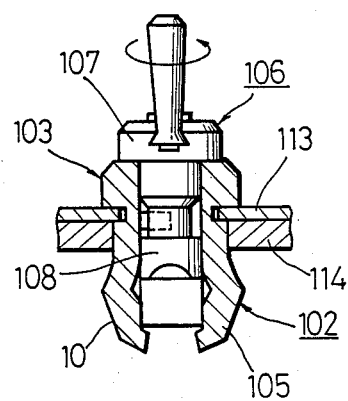

In substitution for the handle formed on the head portion of the male member, a groove may be formed at the head portion so as to be engaged and rotated by a flat screwdriver or a philips screwdriver for example. Although the female member is independent of the male member in the aforementioned embodiment, the lower opening edge of the flat portion of the male member may be integrally connected with the upper edge of the hole of the female member through a thin-walled breakable connection member for example. Further, although the engagement portions 14A in the third embodiment are arranged in opposed relation with each other at the predetermined distance h2, engagement portions 14B may be arranged in a counter manner as shown in FIG. 26, so as to reduce a size of the fastener as a whole.

Having thus described the preferred embodiment of the invention, it should be understood that numerous structural modifications and adaptations may be made without departing from the spirit of the invention.

What is claimed is:

1. A fastener made of synthetic resin or the like for removably fixing a plurality of plate-like members, said fastener comprising a female member and a male member, said female member comprising a base plate formed with a hole into which a shaft portion of said male member is inserted, a stopper of substantially W-shape in section provided with a pair of leg portions extending from a lower surface of said base plate along an edge portion of said hole and a link portion of substantially inversed U-shape in section for connecting said leg portions, and a pair of engagement projections inwardly projecting from an inner periphery of said hole; said male member comprising a head portion, a shaft portion provided with a neck portion downwardly extending from said head portion and a flat portion downwardly extending from said neck portion and adapted to be inserted into said hole, said flat portion being provided with a pair of stop projections and shoulders adapted to be engaged with said engagement projections at an upper portion thereof, said flat portion being formed with a hollow portion opened at a lower end thereof to thereby form a substantially sectionally rectangular cylindrical shape, wherein said link portion of said stopper is rotatably fitted in said hollow portion, and said leg portions and said link portion are elastically deformed to be spread and contracted in interlocking relation with each other.

2. The fastener as defined in claim 1, wherein there arm formed guides adapted to come into contact with a peripheral edge of mount holes of said plate-like members at a peripheral edge perpendicular to said stopper.

3. The fastener as defined in claim 1, wherein said leg portions are formed with outer arcuate surfaces having the same arc extending near to its lower portion and with slant surfaces inclined to an axis side of said hole at the lower portion.

4. The fastener as defined in claim 1, wherein said leg portions are formed with inner arcuate surfaces having slant surfaces downwardly inclined near from its base to the axis side of said hole and also having vertical surfaces at its lower end portion.

5. The fastener as defined in claim 1, wherein thin-walled portions are oppositely formed at the lower ends of said leg portions.

6. The fastener as defined in claim 2, wherein said guides are arcuately formed in a tongue-like shape as viewed in section with a predetermined thickness as extending from the peripheral edge of said hole perpendicular to said leg portions, and are adapted to come into contact with the peripheral edge of said mount holes of said plate-like members.

7. The fastener as defined in claim 1, wherein said neck portion has a predetermined diameter allowed to be inserted between both said engagement projections.

8. The fastener as defined in claim 1, wherein a width of the lower opening of said hollow portion in the direction of its long side is set to a value as permitting expansion of said link portion of said female member, while a width in the direction of its short side is set to a value as permitting insertion of said link portion having a predetermined width under its normal condition.

9. The fastener as defined in claim 1, wherein said stop projections are formed with slits on both sides thereof, and are allowed to be elastically deformed.

10. The fastener as defined in claim 1, wherein said head portion is provided with a handle on an upper surface thereof.

11. A fastener made of synthetic resin or the like for removably fixing a plurality of plate-like members, said fastener comprising a female member and a male member, said female member comprising a base plate formed with a hole into which a shaft portion of said male member is inserted, a pair of opposed stoppers of substantially W-shape in section provided with a pair of leg portions extending from a lower surface of said base plate along an edge portion of said hole and a pair of engagement portions upwardly extending from lower ends of said leg portions and arranged in opposed relation with each other, and a pair of engagement projections inwardly projecting from an inner periphery of said hole; said male member comprising a head portion, a shaft portion provided with a neck portion downwardly extending from said head portion and a flat portion downwardly extending from said neck portion and adapted to be inserted into said hole, said flat portion being provided with a pair of stop projections and shoulders adapted to be engaged with said engagement projections at an upper portion thereof, said flat portion being formed with a hollow portion opened at a lower end thereof to thereby form a substantially sectionally rectangular cylindrical shape, wherein said engagement portions of said stopper are rotatably fitted in said hollow portion, and said leg portions and said engagement portions are elastically deformed to be spread and contracted in interlocking relation with each other.

12. The fastener as defined in claim 11, wherein a width of the lower opening of said hollow portion in the direction of its long side is set to a value as permitting expansion of said engagement portions of the female member, while a width in the direction of its short side is set to a value as permitting insertion of said engagement portions having a predetermined width under its normal condition.

* * * * *